UNITED STATES PATENT OFFICE.

SWIGEL POSTERNAK, OF PARIS, FRANCE, ASSIGNOR TO THE FIRM OF SOCIETY OF CHEMICAL INDUSTRY IN BASLE, OF BASEL, SWITZERLAND.

SOLUBLE SALTS OF THE ANHYDRO-OXYMETHYLEN-DIPHOSPHORIC ACID AND PROCESS OF MAKING SAME.

No. 886,852.      Specification of Letters Patent.      Patented May 5, 1908.

Filed January 17, 1905. Serial No. 241,522. (Specimens.)

*To all whom it may concern:*

Be it known that I, SWIGEL POSTERNAK, a citizen of the French Republic, and resident of Paris, in the Republic of France, have invented certain new and useful Soluble Salts of the Anhydro-Oxymethylen-Diphosphoric Acid and a Process for the Manufacture of the Same, of which the following is a specification.

The invention relates to a process for the production of soluble salts of the anhydro-oxymethylen - diphosphoric acid, $C_2H_8P_2O_9$, which is contained in most of the vegetable food stuffs (see U. S. Letters Patent No. 754,803, and *Comptes Rendus of the Academy of Sciences*, Paris, Vol. 137, p. 134).

Example 1. Ten kilograms of an insoluble tribasic or tetrabasic lime salts of the anhydro-oxymethylen-diphosphoric acid (see *Comptes Rendus de l'Academie des Sciences* 1903 Vol. 137 p. 202 & 337), are dissolved in about thirty liters of muriatic acid of ten per cent.; that is, in more than the quantity of acid which is necessary for transforming the said salts, insoluble in water, into bibasic salts. The solution is then filtered, and precipitated by the addition of about thirty-five liters of alcohol of ninety-five per cent. The precipitate is filtered and pressed, and the pressed cakes are again mixed with alcohol, filtered once more, and then dried in a vacuum at fifty to sixty degrees. Thus is obtained a snow-white powder which is fully soluble in water, and which consists of the new, pure, bicalcic salt of the organic assimilable phosphorous compound of the vegetable food stuffs. Its formula is $C_2P_2H_8O_9Ca$. It contains about 22.5 per cent. of phosphorus and 14.5 per cent. of calcium. The same result is obtained if there is taken, instead of muriatic acid, the equivalent quantity of nitric acid.

In a similar way a unitary, soluble magnesium, strontium, barium or manganese salt, of the same organic phosphorous compound, can be produced when, in the foregoing example, the insoluble lime salt of the said compound is replaced by a corresponding salt of magnesium, strontium, lithium, barium or manganese, which is insoluble in water.

What I claim is:—

1. The improved process for the production of a unitary soluble salt of the anhydro-oxymethylen-diphosphoric acid contained in vegetable food stuffs, which consists in dissolving a corresponding salt, which is insoluble in water, in more than that quantity of an acid which is necessary for transforming the said salt into a bibasic salt, precipitating the soluble bibasic salt of the anhydro-oxymethylen - diphosphoric acid from the solution thus obtained, by the addition of alcohol thereto, isolating the precipitate by filtration, rinsing the same with alcohol, and finally drying the product.

2. As a new product, a unitary acid salt of the anhydro-oxymethylen-diphosphoric acid contained in vegetable food stuffs, corresponding substantially to the formula. $C_2H_6P_2O_9X$ (in which X stands for a metal) which constitutes, in dry state, a white powder, soluble in water and containing more than 20 per cent. of its own weight of phosphorus.

In witness whereof I have hereunto signed my name this third day of January 1905, in the presence of two subscribing witnesses.

SWIGEL POSTERNAK.

Witnesses:
     EDWARD W. DIEHL,
     ARCHIBALD R. BAKER.